(12) United States Patent
Exley et al.

(10) Patent No.: US 7,694,314 B2
(45) Date of Patent: Apr. 6, 2010

(54) UNIVERSAL APPLICATION NETWORK ARCHITECTURE

(75) Inventors: Richard Mark Exley, San Carlos, CA (US); Maria Theresa Barnes Leon, Fremont, CA (US); Hitesh Dholakia, San Jose, CA (US); Manoj Kumar Das, Fremont, CA (US)

(73) Assignee: Siebel Systems, Inc., San Mateo, CA (US)

( * ) Notice: Subject to any disclaimer, the term of this patent is extended or adjusted under 35 U.S.C. 154(b) by 685 days.

(21) Appl. No.: 10/653,028

(22) Filed: Aug. 28, 2003

(65) Prior Publication Data

US 2005/0050555 A1 Mar. 3, 2005

(51) Int. Cl.
G06F 9/44 (2006.01)
(52) U.S. Cl. ........................ 719/328; 709/223
(58) Field of Classification Search ................. 719/310, 719/328, 311; 707/102; 709/223, 238, 250
See application file for complete search history.

(56) References Cited

U.S. PATENT DOCUMENTS

| | | | | |
|---|---|---|---|---|
| 6,985,939 | B2 * | 1/2006 | Fletcher et al. | 709/223 |
| 7,017,162 | B2 * | 3/2006 | Smith et al. | 719/328 |
| 7,035,944 | B2 * | 4/2006 | Fletcher et al. | 709/250 |
| 7,080,092 | B2 * | 7/2006 | Upton | 707/102 |
| 2002/0038336 | A1 * | 3/2002 | Abileah et al. | 709/203 |
| 2002/0144256 | A1 * | 10/2002 | Budhiraja et al. | 717/174 |
| 2003/0028651 | A1 * | 2/2003 | Schreckengast et al. | 709/229 |
| 2003/0093575 | A1 * | 5/2003 | Upton | 709/310 |
| 2003/0105887 | A1 * | 6/2003 | Cox et al. | 709/328 |
| 2003/0110315 | A1 * | 6/2003 | Upton | 709/328 |
| 2003/1010588 | * | 6/2003 | Upton | 719/318 |
| 2003/0177121 | A1 * | 9/2003 | Moona et al. | 707/9 |
| 2003/0217176 | A1 * | 11/2003 | Beunings | 709/238 |
| 2004/0225671 | A1 * | 11/2004 | Carroll et al. | 707/101 |
| 2005/0044197 | A1 * | 2/2005 | Lai | 709/223 |
| 2005/0223392 | A1 * | 10/2005 | Cox et al. | 719/328 |

OTHER PUBLICATIONS

Ambroszkiewicz "Web Service Integration as a New Paradigm for Networked Computing", 2002 IEEE.*
Chan et al. "Information Integration Platform for CIMS" 2000 IEEE, pp. 743-747.*
Bao et al. Integrating Through User Interface: A Flexible Integration Framework for Third-Party Software, 1996 IEEE, pp. 336-342.*
Ponnekanti, Shankar R. and Fox, Armando, "Application-Service Interoperation without Standardized Service Interfaces", Proceedings of the First IEEE International Conference on Pervasive Computing and Communications, pp. 1-8, 2003 IEEE.

* cited by examiner

*Primary Examiner*—Van H Nguyen
(74) *Attorney, Agent, or Firm*—Campbell Stephenson LLP

(57) ABSTRACT

A method and system for providing an integration environment in which integration processes can be developed independent of integration servers and applications. The integration environment provides an application service interface for each application that is independent of the integration servers. An integration process that is developed to use the application service interface is compatible with any integration server that supports the applications that the integration process accesses. The integration environment provides a common service interface for each type of application. The common service interface is independent of the application that is providing the service and is also independent of the integration server. Thus, an integration process developed to use the common service interface is compatible with any application of the appropriate type and any integration server.

28 Claims, 13 Drawing Sheets

UNIVERSAL APPLICATION NETWORK ARCHITECTURE

TECHNICAL FIELD

The described technology relates generally to business processes that execute on integration servers.

BACKGROUND

An integration server is a computer server that facilitates the development of business processes, more generally integration processes, that access various applications. The applications may include prepackaged applications developed by an application provider and customized or legacy applications developed by an enterprise. The applications may be of any type such as Customer Relationship Management ("CRM") applications, Enterprise Resource Planning ("ERP") applications, Employee Relationship Management ("ERM") applications, and so on. An integration server may provide an integration server interface for each application through which a business process can access the services of an application and can provide services to the application. Since various applications often provide application programming interfaces that use formats, protocols, and other features that may be very different from the applications of other application providers, each integration server vendor typically defines their own integration server interfaces to each application. The integration server interfaces of an integration server vendor typically provide to the integration processes a more uniform interface to the applications.

FIG. 1 is a block diagram illustrating a typical architecture of an integration server. The integration server 100 provides access to various applications 101-104. In this example, application 101 and application 102 are the same type of application but are provided by different application providers. For example, applications 101 and 102 may be CRM applications provided by different vendors. Application 103 and application 104 are the same type of application, such as ERP applications. The parentheticals within the blocks representing applications 101-104 indicate the type of application and the application. For example, the parenthetical "(2, 1)" in the block representing application 103 represents an application type of "2" provided by application provider "1." Each integration server may provide integration server interfaces 111-114 to applications 101-104, respectively. Thus, each integration server provides at least one integration server interface for each application that it supports. The parentheticals in the blocks representing integration server interfaces 111-114 represent the type of application, application, and integration server. For example, the parenthetical "(2, 1, k)" in the block representing integration server interface 113 indicates that the interface is for an application type of "2" provided by application provider "1" for the integration server provided by vendor "k." Each business process 150 that is implemented on an integration server is developed specifically to use the integration server interfaces of that integration server for each application. Thus, if an enterprise that has developed a business process using application 101 and application 104 wants to switch to application 103, the enterprise needs a new version of the business process developed specifically to access integration server interface 113, rather than integration server interface 114. More generally, if a business process is developed to accommodate all possible combinations of applications provided by various integration servers, then the number of versions of the business processes needed to access the different applications is represented by the following equation:

$$m \prod^{i} n_i$$

where m represents the number of integration servers, i represents the types of applications that the business process accesses, and $n_i$ represents the number of different applications for application type i. For example, if there are five integration servers, a business process accesses three types of applications, and each type of application has four possible applications, then the number of versions of the business process that needs to be developed to access all combinations of integration servers and applications is 320.

Because the number of versions is so large, providers of business processes either limit the integration servers and applications that their business processes support or spend considerable resources developing many different versions of each business process. Similarly, an enterprise that wants to switch integration servers or applications needs to ensure that the provider of its business processes can provide a version that supports the new integration server and applications. In addition, if the enterprise has custom business processes, then it would need to develop new versions to support the new integration server and applications. It would be desirable to have business processes that were portable from one integration server to another and from one application to another.

DETAILED DESCRIPTION

Figure 1:
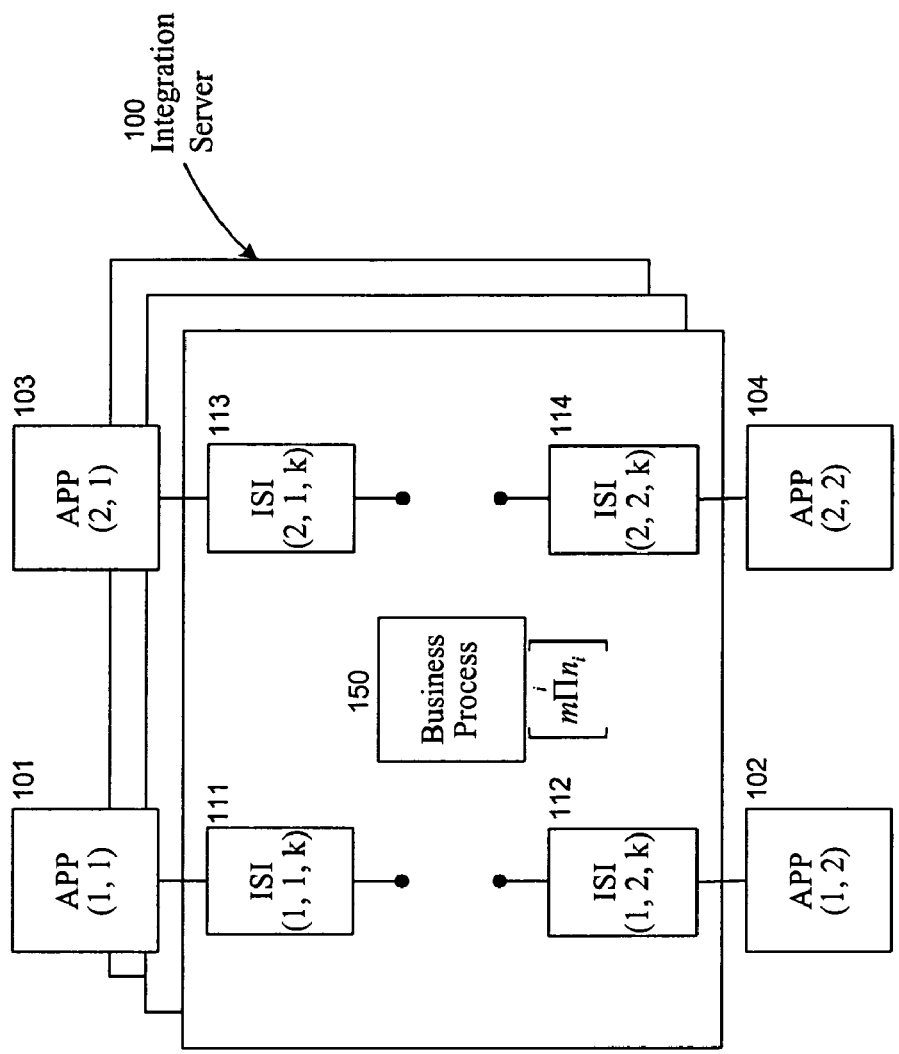
FIG. 1 is a block diagram illustrating the typical architecture of an integration server.

A method and system for providing an integration environment in which integration processes can be developed independent of integration servers and applications is provided. In one embodiment, the integration environment, also referred to as the Universal Application Network ("UAN"), provides an application service interface for each application that is independent of the integration servers. For example, an application service interface may be provided for a Siebel CRM application that is the same for the Tibco, SeeBeyond, and webMethods integration servers. Thus, an integration process that is developed to use the application service interface is compatible with any integration server that supports the applications (i.e., provides implementation of the application service interfaces) that the integration process accesses. In another embodiment, the integration environment provides a common service interface for each type of application. The common service interface is independent of the application that is providing the service and is also independent of the integration server. For example, a common service interface may be provided for a CRM application that is the same for the CRM applications of different providers and for Tibco and SeeBeyond integration servers. Thus, an integration process developed to use the common service interface is compatible with any application of the appropriate type and any integration server. In this way, integration processes that use the common service interface can be executed without modification on any integration server that supports the common service interface for those types of applications accessed by the integration process. Moreover, if an integration server supports multiple applications of the type accessed by an integration process, then the applications can be interchanged without modification of the integration process. As a result, if an integration process uses the common service interface of the integration environment, then only one version of that business process is needed.

In one embodiment, the common service interfaces are implemented using the application service interface. Each integration server vendor may provide an implementation of the application service interface for each application that it supports. Thus, an integration server vendor that supports CRM applications of two different providers needs two implementations. These implementations typically provide a syntactic translation between the integration service interface to the application and the application service interface. Thus, a translator, also referred to as an adapter, is developed for each application supported by each integration server. An implementation of each common service interface provides a semantic translation between the common service interface for a type of application and the application service interfaces for the applications of that type. Thus, a transform is developed for each application service interface.

Figure 2:
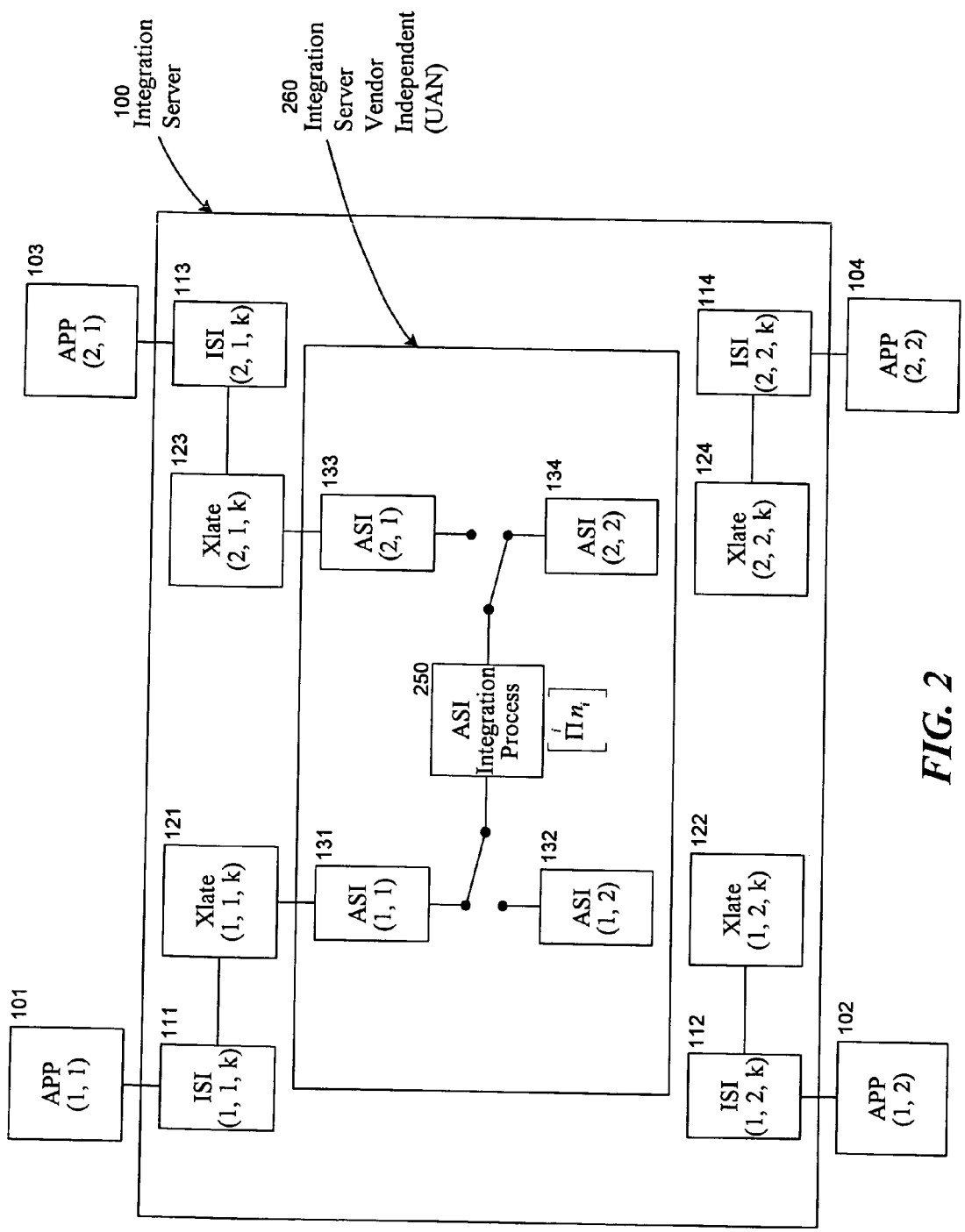
FIG. 2 is a block diagram illustrating the architecture of an integration environment in which integration processes use the application service interfaces.

FIG. 2 is a block diagram illustrating the architecture of an integration environment in which integration processes use the application service interfaces. The integration server 100 has applications 101-104 and integration server interfaces 111-114 as described in reference to FIG. 1. In this case, the integration server has implemented translators 121-124 to translate between integration server interfaces 111-114 and application service interfaces 131-134. The integration process 250 is independent of the underlying integration server. So, for example, the integration process, which may be developed to use application service interface 131 and application service interface 134, can execute on any integration server that supports application service interfaces 131 and 134. The parentheticals in the blocks representing translators 121-124 represent the type of application, application, and integration server that the translator supports. For example, the parenthetical "(2, 1, k)" in the block representing translator 123 corresponds to type of application "2" provided by application provider "1" for the integration server provided by vendor "k." Since there is a one-to-one correspondence between translators and integration server interfaces, the number of translators needed to provide an application service interface for each application supported by an integration server is the same as the number of integration server interfaces. For example, if there are three different types of applications and each type of application has four applications, then the total number of translators is 12. If one of the applications accessed by integration process 250 is changed to a different application, then a new version of the integration process is needed that will access the application service interface of the new application. Thus, the number of versions of the integration process that is needed to support all possible combinations of applications that implement the types of applications accessed by the integration process is represented by the following equation:

$$\prod^i n_i$$

So, for example, if there are three different types of applications and each type of application has four applications, then the total number of versions of the business process need to support all combinations of applications is 64.

Figure 3:
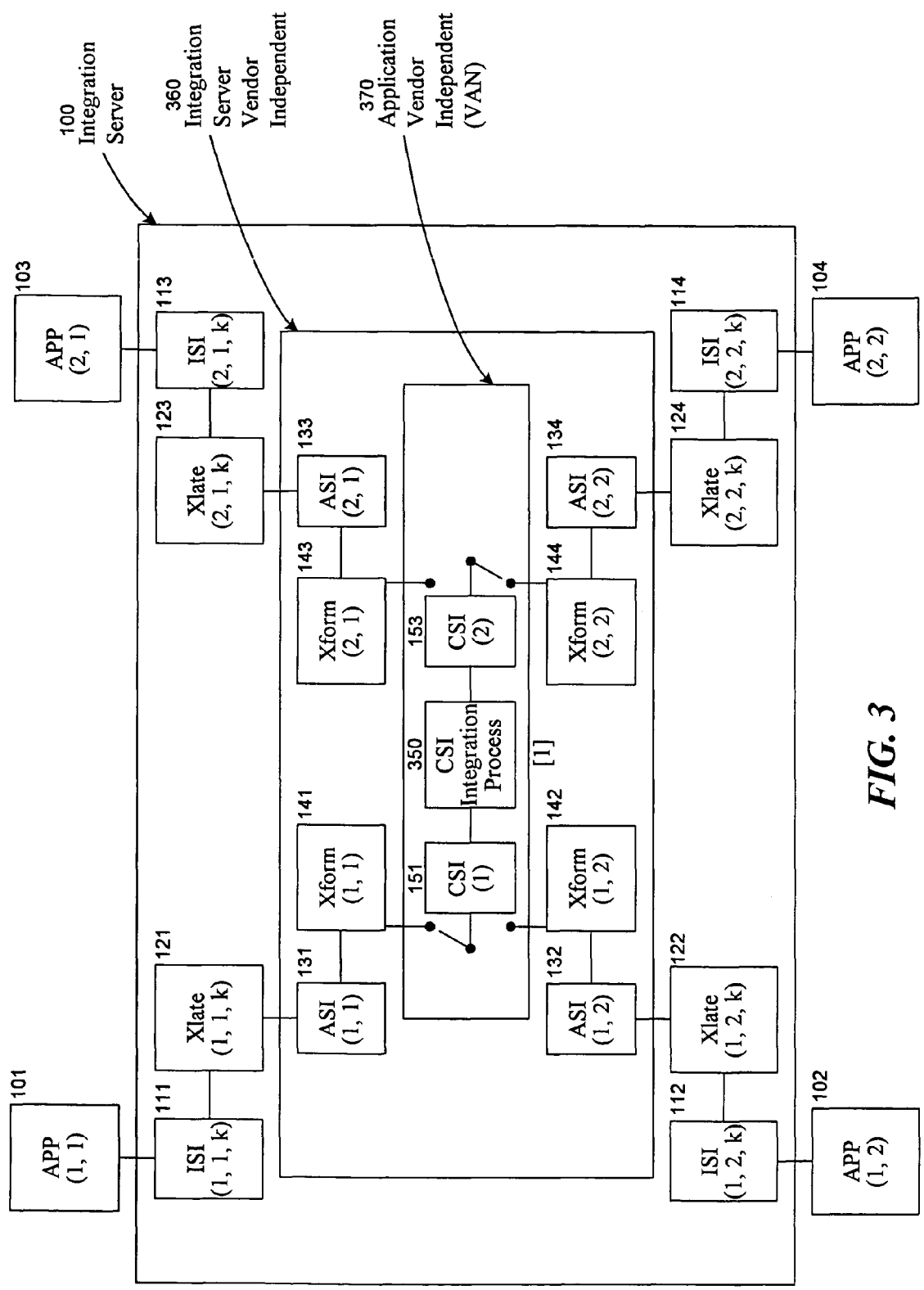
FIG. 3 is a block diagram illustrating the architecture of an integration environment in which integration processes use the common service interfaces.

FIG. 3 is a block diagram illustrating the architecture of an integration environment in which integration processes use the common service interfaces. The integration server 100 provides the same application service interfaces 131-134 as described in reference to FIG. 2. Transforms 141-142 are developed to implement the common service interface 151 for their type of application, and transforms 143-144 are developed to implement the common service interface 153 for their type of application. Since the transforms 141-144 access the application service interface, they are independent of the underlying integration server. Since there is a one-to-one correspondence between each application service interface and transform, the number of transforms needed is the same as the number of application service interfaces. The integration process 350 is developed to use the common service interfaces 151 and 153 that support the types of application that the integration process accesses. Thus, if one application is replaced by another application of the same type, then the common service interface simply needs to be switched to use the transform associated with that new application and the integration process need not be modified. Thus, only one version of the integration process is needed to support any combination of applications and integration servers.

In one embodiment, the common service interface is defined by a set of Web Service Definition Language ("WSDL") documents that specify the interface between an integration process and a transform. The WSDL documents define abstract functions of the common service interface that can be invoked by an integration process or a transform and specify concrete bindings to their implementations. An implementation may be developed in any language suitable for creating web services, such as the Business Process Execution Language ("BPEL") or the Extensible Stylesheet Language Transformation ("XSLT"). When a transform invokes an abstract function of the common service interface, a WSDL document is used to identify the integration process function or service that implements the abstract function. Similarly, when an integration process invokes an abstract function of the common service interface, a WSDL document is used to identify a transform that implements the abstract function. In one embodiment, the application service interface is also defined by a set of WSDL documents that specify the interface between a transform and a translator. The WSDL documents define the abstract functions of the application service interface that can be invoked by a transform or a translator and specify concrete bindings to their implementations. The abstract functions of the application service interface are invoked in much the same way as for the abstract functions of the common service interface.

Figure 4:
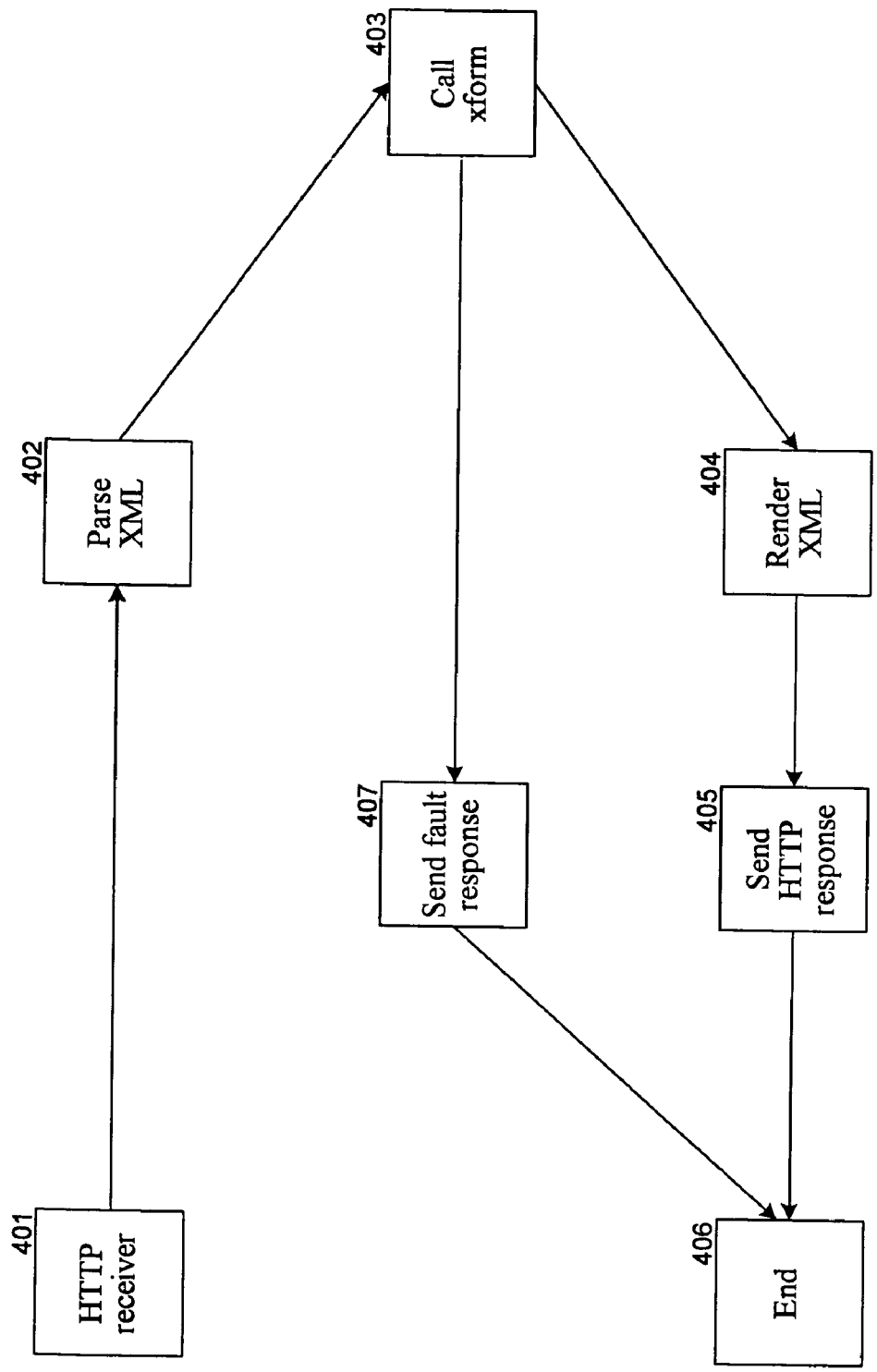
FIG. 4 is a block diagram illustrating the flow of control of an example translator in one embodiment.

FIG. 4 is a block diagram illustrating the flow of control of an example translator in one embodiment. The translator represents an implementation of an inbound call from an application. In this example, the application and translator communicate via an HTTP transport. One skilled in the art will appreciate that other communications protocols can be used. Block 401 represents the receiving of an HTTP request from the application via an HTTP connection. Block 402 represents the translating of the XML message of the request into the format of the transform that is to be invoked. Block 403 represents a synchronous call to a transform passing the translated message as input data. When the call completes, it returns output data or an error message. Block 404 represents the translating of the output data into an XML message to be sent to the application. Block 405 represents the sending of an HTTP response with the translated output data to the application. Block 407 represents the sending of an HTTP response indicating an error to the application.

Figure 5:
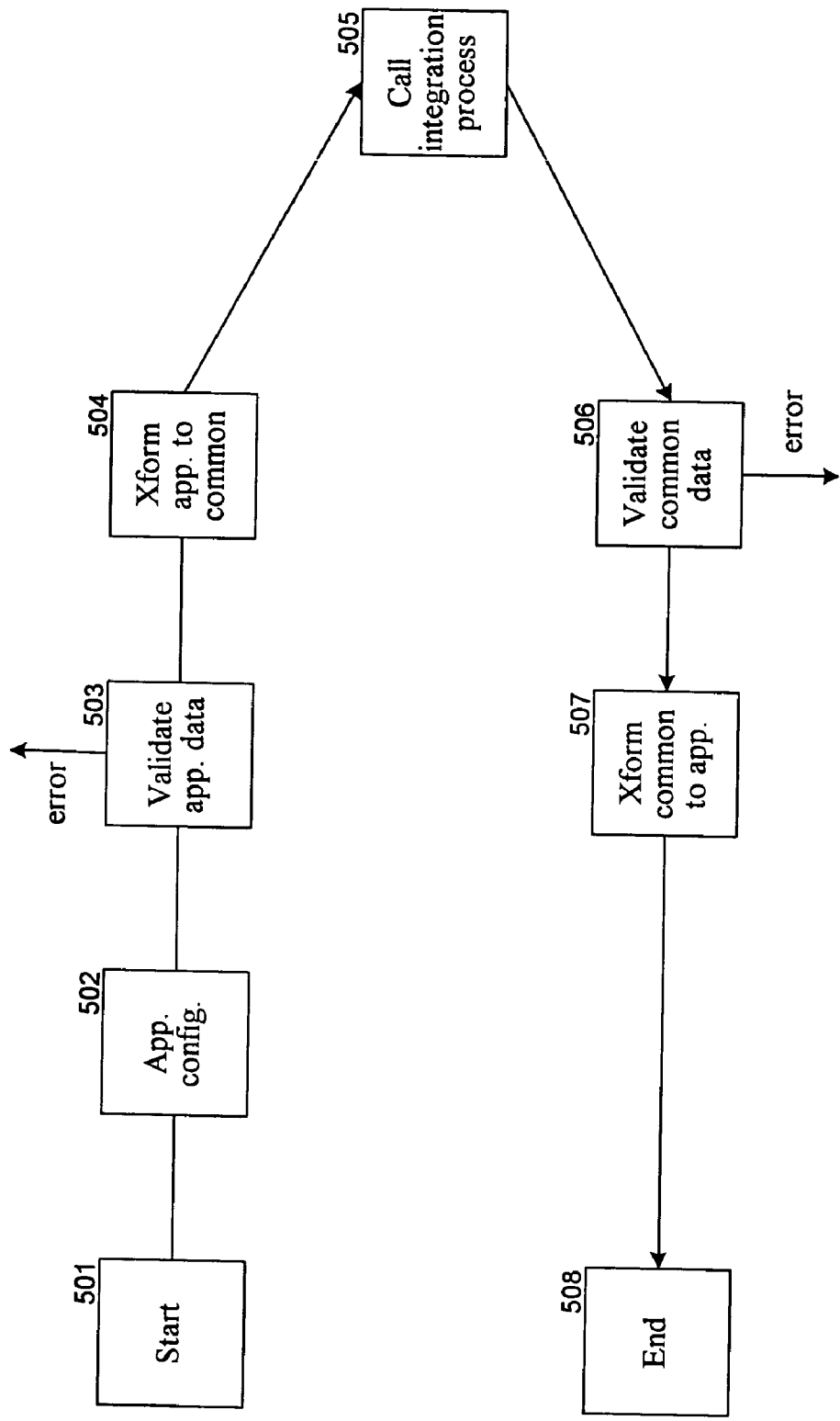
FIG. 5 is a block diagram illustrating the flow of control of an example transform in one embodiment.

FIG. 5 is a block diagram illustrating the flow of control of an example transform in one embodiment. The transform represents an implementation of an inbound call from an application. Block 501 represents the invocation of the transform by a translator. Block 502 represents the retrieving of configuration information for the application. This configuration information is used to control the processing of the transform. Block 503 represents validation of the input data received when the transform was invoked. If the data is not valid, then the transform signals a validation error, for example, by posting an event message. Block 504 represents the transforming of the input data to the common format of the common service interface. In one embodiment, standard objects are defined by the common service interface. An example of such standard objects is provided in U.S. patent application Ser. No. 10/396,730, entitled "Data Model for Business Relationships" and filed on Mar. 24, 2003, which is hereby incorporated by reference. Block 505 represents the invocation of the integration process passing the data in the common format as input data. In this example, the invocation is synchronous. Block 506 represents the validation of the output data in the common format that is returned by the integration process. If the output data is not valid, then the transform signals a validation error. Block 507 represents the transformation of the output data in common format to the format of the application. Block 508 represents the returning from the invocation and returning of the output data to the invoking translator. One skilled in the art will appreciate that a transform may invoke many different integration process services and application services to effect the transformation. For example, the transformation of the input data to the common format may require invoking an application via an application service interface to retrieve additional data needed for the transformation of the input data to the common format.

Table 1 illustrates a sample application service interface defined using a WSDL document in one embodiment. The application service interface includes three primary WSDL elements: port type, binding, and message. In one embodiment, the port type element is the same for all application service interfaces. The binding element provides information on how an integration server vendor should configure its translator. The message element defines the input and output messages for the application service interface. This WSDL document defines an asynchronous call to an application, and thus only the input message is defined. A WSDL document for a synchronous call would also define an output message.

TABLE 1

```
<?xml version="1.0"?>
<wsdl:definitions xmlns:wsdl="http://schemas.xmlsoap.org/wsdl/"
    xmlns:tns="http://www.Company.com/uan/wsdl/ApplicationInterfaces/ACME/Order
Management/PublishORDERS05ACME46c"
xmlns:uang-asi="http://www.Company.com/uangrammar/ApplicationBindings"
    xmlns:ns1="http://www.Company.com/UAN/appSchema/46C/basic/IDOCS/ORDE
RS05"
    xmlns:ns2="http://www.Company.com/uangrammar/messages" name="default"
targetNamespace="http://www.Company.com/uan/wsdl/ApplicationInterfaces/ACME/
OrderManagement/ORDERS05ACME46c">
    <wsdl:import
namespace="http://www.Company.com/UAN/appSchema/46C/basic/IDOCS/ORDE
RS05" location="ACME46cORDERS05.xsd"/>
        <wsdl:portType name="Default">
            <wsdl:operation name="Execute">
                <wsdl:input message="tns:Execute_input"/>
                <wsdl:output message="tns:Execute_output"/>
                <wsdl:fault name="generalFault" message="ns2:SimpleStringMessage"/>
            </wsdl:operation>
        </wsdl:portType>
    <wsdl:binding name="Default" type="tns:Default">
        <uang-asi:Application Application="ACME" ApplicationVersion="4.6c"/>
        <wsdl:operation name="Execute">
            <uang-asi:Operation IDOC="ORDERS05"/>
        </wsdl:operation>
    </wsdl:binding>
    <wsdl:message name="Execute_input">
        <wsdl:part name="ORDERS05" element="ns1:ORDERS05"/>
    </wsdl:message>
    <wsdl:message name="Execute_output"/>
</wsdl:definitions>
```

Table 2 illustrates a sample common service interface defined using a WSDL document in one embodiment. This common service interface represents an outbound call from an integration process to an application. This common service interface provides two services (i.e., operations) for transforming data from a common format to the format of the application. The data to be transformed can be in a single-part or multi-part form, depending on the source of the data. Thus, the WSDL document defines separate single-part and multi-part input and output messages. The binding element specifies the XSL Transform ("XSLT") defined using the Extensible Transform Language ("XSL") that is invoked when the single-part transform operation is invoked. The WSDL document also defines various namespaces containing schemas for the common and application formats, containing the XSLTs, and so on.

TABLE 2

```xml
<?xml version="1.0" ?>
<wsdl:definitions
        xmlns:uang-common="http://www.Company.com/uangrammar/2002/03/common/"
        xmlns:wsdl="http://schemas.xmlsoap.org/wsdl/"
        xmlns:tns="http://www.Company.com/uan/wsdl/TransformationProcesses/CustomerLifeCycle/Transformations/ACME/CommonToACMEDEBMAS05SyncAccountSrc_WSDL"
        xmlns:uang-asi="http://www.Company.com/uangrammar/ApplicationBindings"
...
        <wsdl:import namespace="http://www.Company.com/uan/commonobjects/common"
location="../../../../CommonObjects/Common.xsd" />
...
        <wsdl:message name="Transform_Multi_Part_input">
            <wsdl:part name="app" element="ns1:app" />
            <wsdl:part name="listOfOrg" element="ns2:listOfOrg" />
            <wsdl:part name="DEBMAS05" element="ns3:DEBMAS05" />
        </wsdl:message>
        <wsdl:message name="Transform_Multi_Part_output">
            <wsdl:part name="DEBMAS05" element="ns3:DEBMAS05" />
        </wsdl:message>
        <wsdl:message name="generalFault">
            <wsdl:part name="Message" type="ns4:string" />
        </wsdl:message>
        <wsdl:message name="Transform_Single_Part_input">
            <wsdl:part name="root" element="ns5:root" />
        </wsdl:message>
        <wsdl:message name="Transform_Single_Part_output">
            <wsdl:part name="root" element="ns6:root" />
        </wsdl:message>
        <wsdl:portType name="Default">
            <wsdl:operation name="Transform_Multi_Part">
                <wsdl:input message="tns:Transform_Multi_Part_input" />
                <wsdl:output message="tns:Transform_Multi_Part_output" />
                <wsdl:fault name="generalFault" message="tns:generalFault" />
            </wsdl:operation>
            <wsdl:operation name="Transform_Single_Part">
                <wsdl:input message="tns:Transform_Single_Part_input" />
                <wsdl:output message="tns:Transform_Single_Part_output" />
                <wsdl:fault name="generalFault" message="tns:generalFault" />
            </wsdl:operation>
        </wsdl:portType>
        <wsdl:binding name="xslt" type="tns:Default">
            <wsdl:operation name="Transform_Single_Part">
                <uang-bpws:operation type="xslt"
location="CommonToACMEDEBMAS05SyncAccountSrc.xsl" />
            </wsdl:operation>
        </wsdl:binding>
...
</wsdl:definitions>
```

Table 3 contains the XSLT that implements the single-part transform service of the common service interface of Table 2. This XSLT invokes functions provided by the UAN to allow mapping between data of different applications. The functions for mapping are described below in detail.

TABLE 3

```
<?xml version="1.0" ?>
<xsl:stylesheet xmlns:xsl="http://www.w3.org/1999/XSL/Transform"
    xmlns:pfx="http://www.Company.com/uan/commonobjects/party"
    xmlns:pfx2="http://www.Company.com/uan/commonobjects/common" ...
    xmlns:pfx4="http://www.Company.com/uan/output_envelopes/TransformationProcess
es/CustomerLifeCycle/Transformations/ACME/CommonToACMEDEBMAS05SyncAccou
ntSrc" xmlns:uang-common="http://www.Company.com/uangrammar/2002/03/common/"
version="1.0" exclude-result-prefixes="uan">
...
    <xsl:template match="/*">
        <pfx4:root>
            <pfx3:DEBMAS05>
                <IDOC>
                <pfx3:EDI_DC40 />
                <xsl:for-each select="/*/pfx:listOfOrg/pfx:org[1]">
                    <pfx3:E1KNA1M>
                        <xsl:choose>
                            <xsl:when test="(uan:GetAppID("CUSTOMER",
/*/pfx2:app/pfx2:instance, pfx:id) )!=""">
                                <KUNNR>
                                    <xsl:value-of select="uan:GetAppID("CUSTOMER",
/*/pfx2:app/pfx2:instance, pfx:id)" />
                                </KUNNR>
                            </xsl:when>
                            <xsl:otherwise>
                                <xsl:if test="(uan:SetCommonID("CUSTOMER",
/*/pfx2:app/pfx2:instance, /*/pfx3:DEBMAS05/IDOC/pfx3:E1KNA1M/KUNNR, pfx:id)
)!="">
                                    <xsl:if test="(uan:SetCommonID("ADDRESS",
/*/pfx2:app/pfx2:instance, /*/pfx3:DEBMAS05/IDOC/pfx3:E1KNA1M/KUNNR,
pfx:listOfAddress/pfx:address[1]/pfx:id) )!="">
                                        <KUNNR>
                                            <xsl:value-of
select="uan:GetAppID("CUSTOMER", /*/pfx2:app/pfx2:instance, pfx:id)" />
                                        </KUNNR>
                                    </xsl:if>
                                </xsl:if>
                            </xsl:otherwise>
                        </xsl:choose>
                    </pfx3:E1KNA1M>
                </xsl:for-each>
                </IDOC>
            </pfx3:DEBMAS05>
        </pfx4:root>
    </xsl:template>
</xsl:stylesheet>
```

Cross-Reference Services

The cross-reference service allows for the mapping and connecting of records within the UAN between different applications. This service supports the translating of information that represents the same underlying data in different ways. For example, different applications may use different naming conventions for country code or may use different keys to identify a record. The cross-reference service provides identifier cross-reference functions and value cross-reference functions to help in the translating or cross-referencing. The identifier cross-reference functions are used to map identifiers of dynamic records, and the value cross-reference functions are used to map values of static records. Dynamic records are generated by an application during run-time. For example, a customer record can be created during run-time and is thus a dynamic record. Static records are predefined. For example, country codes are static.

The UAN stores mappings of identifiers for dynamic records between instances of applications. Although only one instance of an application is typically part of the UAN, it is possible that the same application can be executing on multiple servers connected to the UAN. Therefore, the UAN tracks identifiers by application instance that uses the identifiers. When a transform provides a record of one application to another application, the transform registers the identifier of that record with the cross-reference service. The cross-reference service assigns a common identifier and returns it to the transform. When the record is provided to the other application, the other application returns its identifier to the transform. The transform then registers the identifier of the other application with the cross-reference service using the common identifier. As a result, the cross-reference service has a mapping of the common identifier to the identifiers of each application. When the identifier of an application is subsequently provided to the transform, the transform uses the cross-reference service to retrieve the identifier of the other application.

Figure 6:
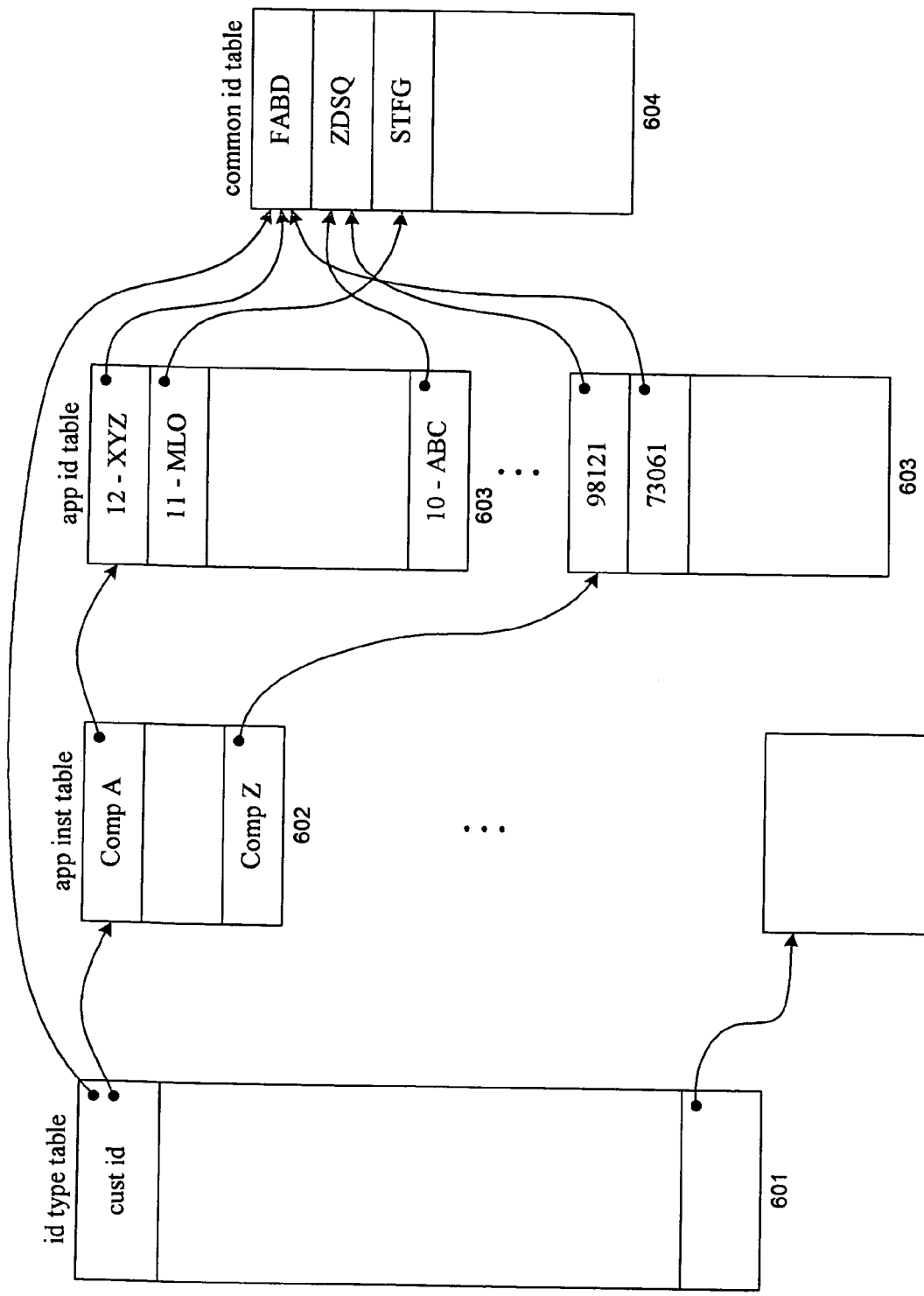
FIG. 6 is a block diagram illustrating the identifier data structure of the cross-reference service in one embodiment.

FIG. 6 is a block diagram illustrating the identifier data structure of the cross-reference service in one embodiment. One skilled in the art will appreciate that many different organizations of the data structure can be used to represent the mapping of application identifiers to common identifiers. In this example, the data structure includes the identifier type table 601, application instance tables 602, application identifier tables 603, and common identifier tables 604. The identifier type table contains an entry for each identifier type that has been configured into the cross-reference service. An identifier type identifies the type of data being registered with the cross-reference service. For example, the identifier type may be customer ID, account number, invoice number, and so on. Each entry of the identifier type table contains a reference to an application instance table and a common identifier table. The application instance table of an identifier type contains an entry for each application instance that has been configured for the corresponding identifier type. Each entry contains a reference for the application instance and a reference to an application identifier table for that application instance. The application identifier table contains an entry for each identifier that has been registered for that application instance. Each entry of the application identifier table contains the identifier and a reference to an entry in the common identifier table for that identifier type. The common identifier table contains an entry for each common identifier that has been defined for that identifier type. Thus, the entries of the application identifier table map to the corresponding common identifiers. In one embodiment, a common identifier table may also include a reference back to each application identifier so that each application identifier that maps to a common identifier can be quickly located.

Figure 7:
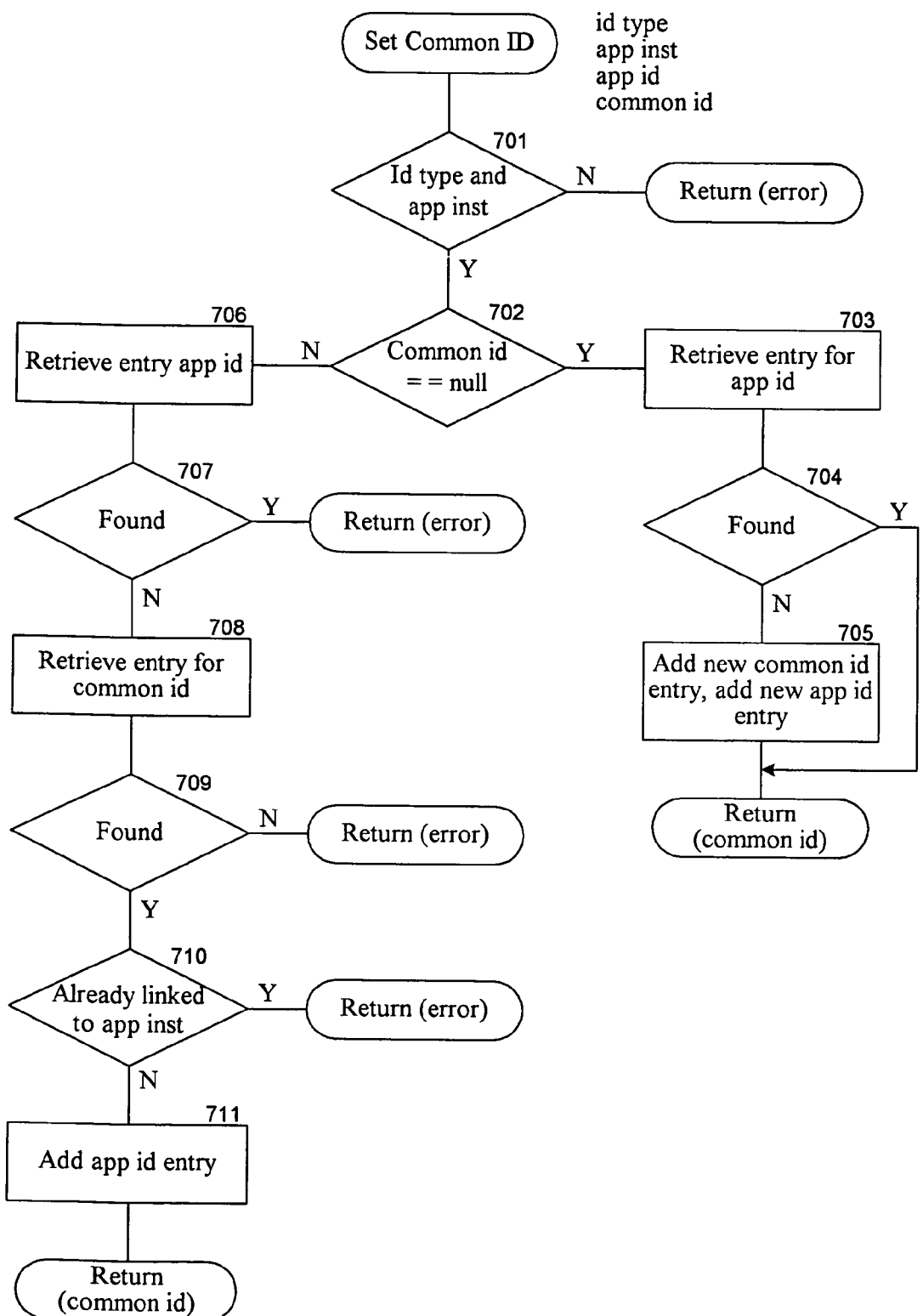
FIG. 7 is a flow diagram of the set common identifier function in one embodiment.
Figure 8:
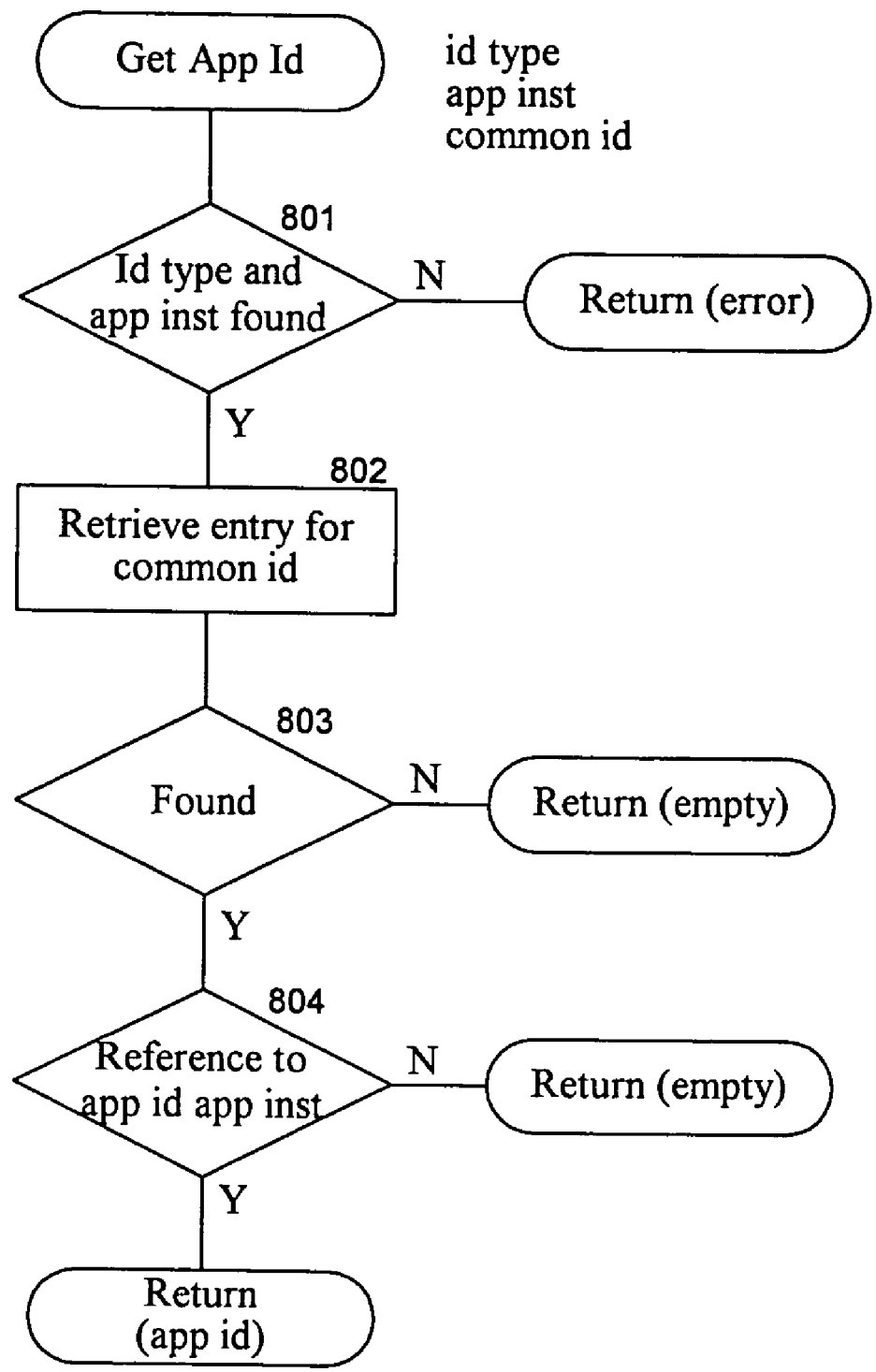
FIG. 8 is a flow diagram of the get application identifier function in one embodiment.
Figure 9:
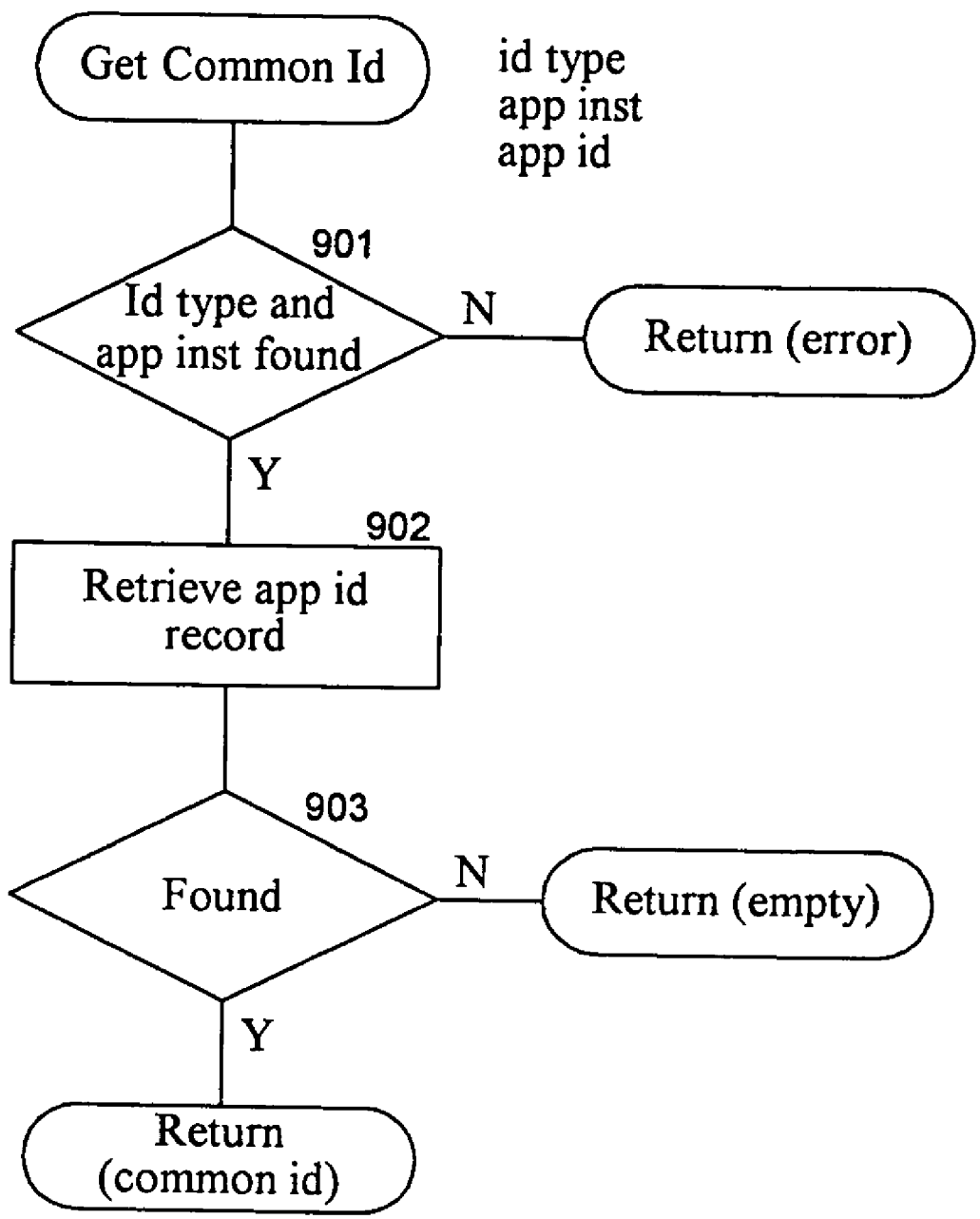
FIG. 9 is a flow diagram of the get common identifier function in one embodiment.

FIGS. 7-9 are flow diagrams of identifier cross-reference service functions in one embodiment. FIG. 7 is a flow diagram of the set common identifier function in one embodiment. The set common identifier function is invoked to register an application identifier. The function is passed an identifier type, an application instance, an application identifier, and optionally a common identifier. If a common identifier is not passed, then the function registers the application identifier with a new common identifier, which it returns. If a common identifier is passed, then the function registers the application identifier with that common identifier. In decision block 701, if the passed identifier type is in the identifier type table and the passed application instance is in the corresponding application instance table for the passed identifier type, then the function continues at block 702, else the function returns an error. In one embodiment, the identifier types and application instances are provided in configuration information to the cross-reference service. One skilled in the art will appreciate that the identifier types and application instances can alternatively be dynamically added to the identifier data structure. In decision block 702, if the common identifier is not passed, then the function continues at block 703, else the function continues at block 706. In blocks 703-705, the function adds a new registration with a new common identifier if the application identifier is currently not registered. Otherwise, the function returns the common identifier. In block 703, the function retrieves the entry for the passed application identifier from the application identifier table. In decision block 704, if the entry was retrieved, then the function returns the common identifier of that entry, else the function continues at block 705. In block 705, the function adds an entry with a new common identifier to the common identifier table for the passed identifier type. The function also adds an entry to the application identifier table and then returns the common identifier. In blocks 706-711, the function registers the passed application identifier corresponding to an already registered application identifier as identified by the passed common identifier. In block 706, the function retrieves an entry for the passed application identifier from the application identifier table. In decision block 707, if an entry is retrieved, then the function returns an error because an entry for the passed application identifier already exists, else the function continues at block 708. In block 708, the function retrieves an entry for the passed common identifier from the common identifier table. In decision block 709, if the entry was retrieved, then the function continues at block 710, else the function returns an error because the function was requested to register with an incorrect common identifier. In decision block 710, if the retrieved common identifier entry is already linked to an application identifier entry for the passed application instance, then the function returns an error because another application identifier for the passed application instance was registered with the passed common identifier, else the function continues at block 711. In block 711, the function adds an entry to the application identifier table linked to the entry of the common identifier table. The function then returns the common identifier.

FIG. 8 is a flow diagram of the get application identifier function in one embodiment. The function is passed an identifier type, an application instance, and a common identifier and returns the corresponding application identifier. In decision block 801, if the passed identifier type is in the identifier type table and the passed application instance is in the application instance table for the passed identifier type, then the function continues at block 802, else the function returns an error. In block 802, the function retrieves the entry for the passed common identifier from the common identifier table. In decision block 803, if an entry was retrieved, then the function continues at block 804, else the function returns an indication that an entry for the passed common identifier does not exist. In decision block 804, if the entry of the common identifier table contains a reference to an application identifier for the passed application instance, then the function returns that application identifier, else the function returns an indication that no application identifier for the passed application instance and passed identifier type exists for the passed common identifier.

FIG. 9 is a flow diagram of the get common identifier function in one embodiment. The function is passed an identifier type, an application instance, and an application identifier. The function returns the common identifier that corresponds to the passed application identifier. In decision block 901, if the passed identifier type is in the identifier type table and the passed application instance is in the application instance table for the passed identifier type, then the function continues at block 902, else the function returns an error. In block 902, the function retrieves an entry for the passed application identifier from the application identifier table. In block 903, if the application identifier entry was retrieved, then the function returns the common identifier of the entry, else the function returns an indication that the application identifier was not found.

Figure 10:
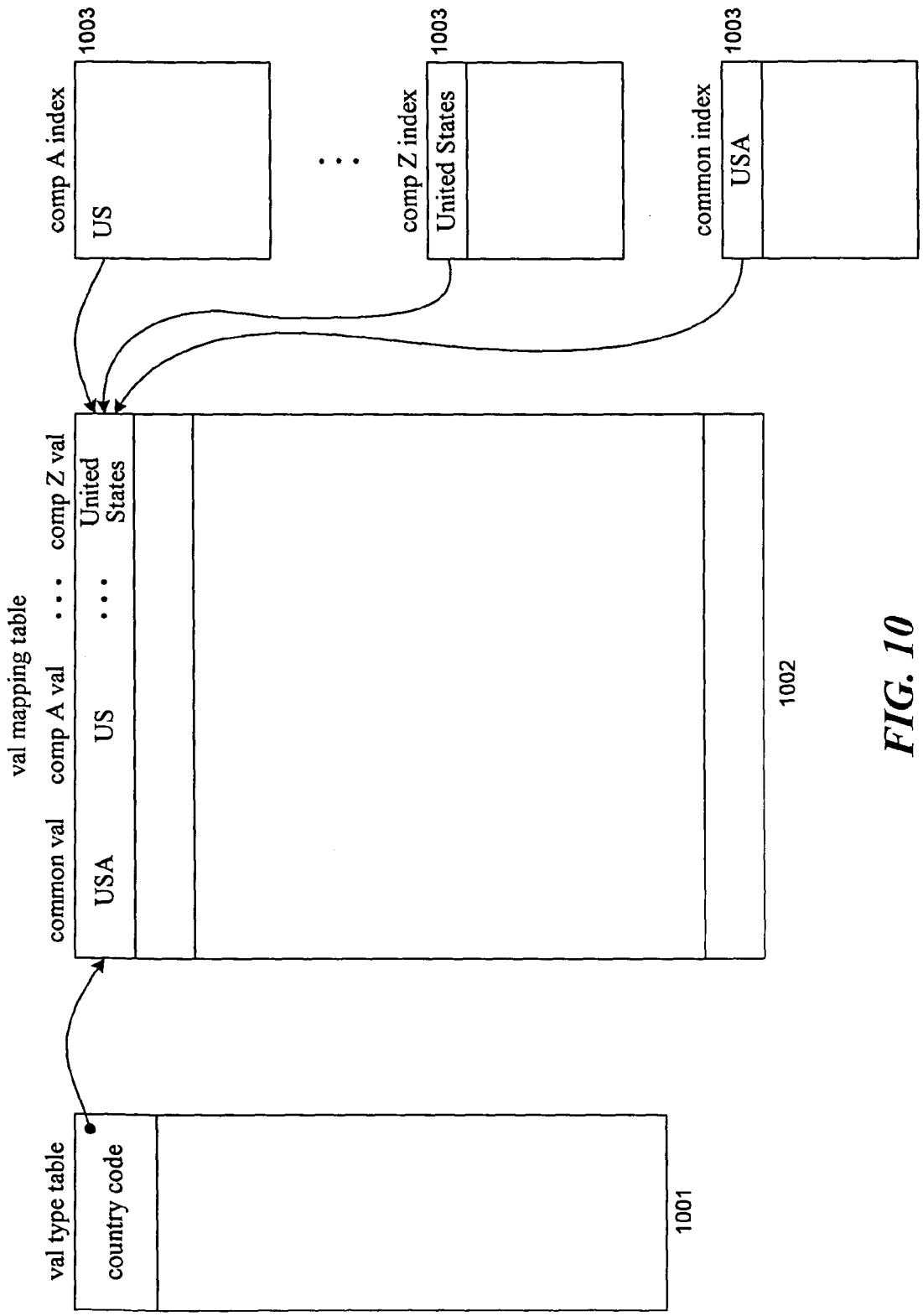
FIG. 10 is a block diagram illustrating the value data structure of the cross-service reference in one embodiment.

FIG. 10 is a block diagram illustrating the value data structure of the cross-service reference in one embodiment. The value data structure contains the values for the static records of the applications. The value data structure may be initialized from configuration information when the UAN is configured. The value data structure contains information that maps between applications corresponding values of a value type. The value data structure includes the value type table 1001, value mapping tables 1002, and indexes 1003. The value type table contains an entry for each value type that is registered with the value data structure. Each entry of the value type table contains a value type and a reference to the value mapping table for that value type. The value mapping table contains the entry for each unique value for that value type. Each entry contains a common value and a value for each application in a separate field. Instances of the same application can share the same value mapping information. Each value mapping table includes an index for each application instance of the value mapping table. Each index maps the values of the application to the corresponding entry in the value mapping table. One skilled in the art will appreciate that many different organizations of the value data structure can be used to store the value registrations of the cross-reference service. One skilled in the art will also appreciate that a data structure similar to the identifier data structure can be used. If a similar data structure is used, then value cross-reference service functions similar to the identifier cross-reference functions may also be used.

Figure 11:
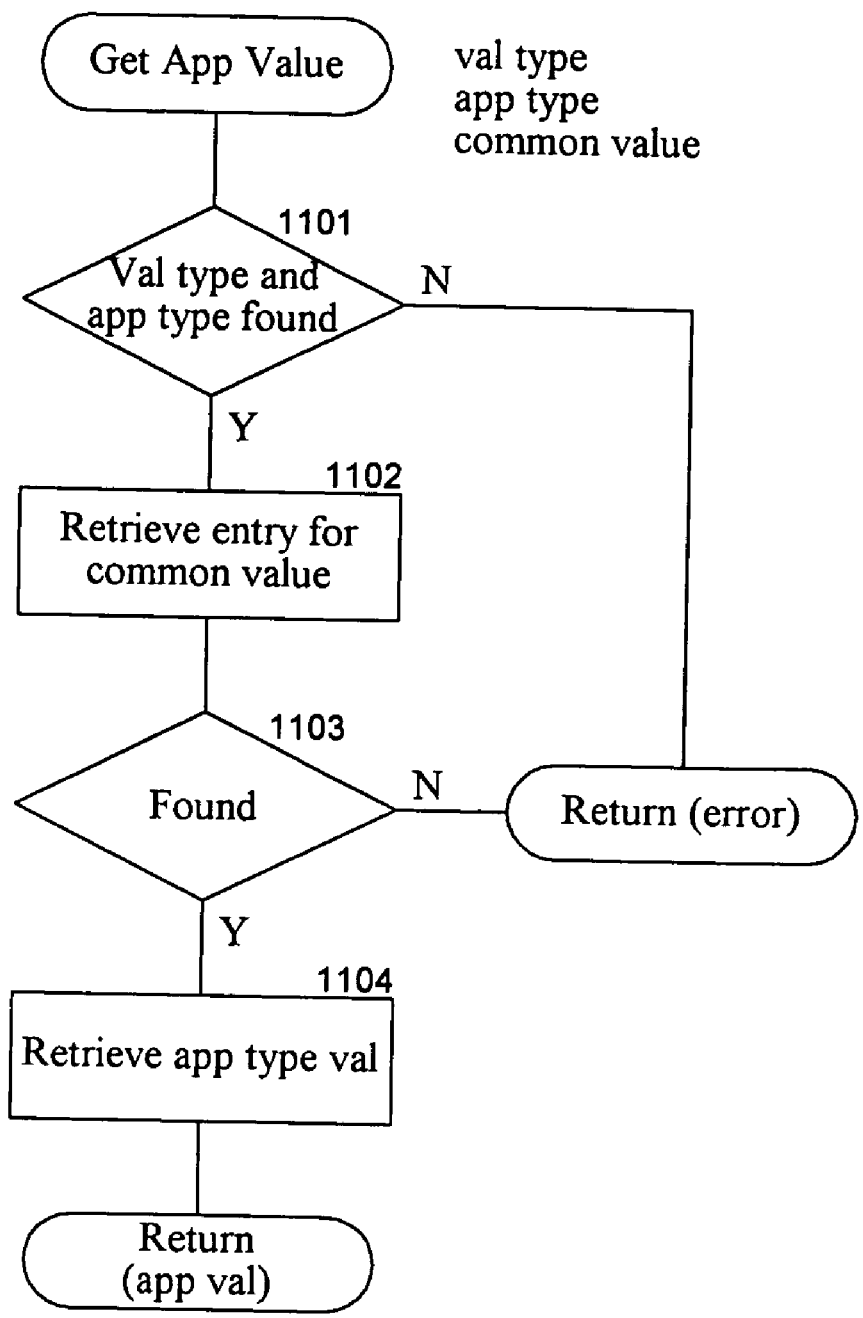
FIG. 11 is a flow diagram of the get application value function in one embodiment.
Figure 12:
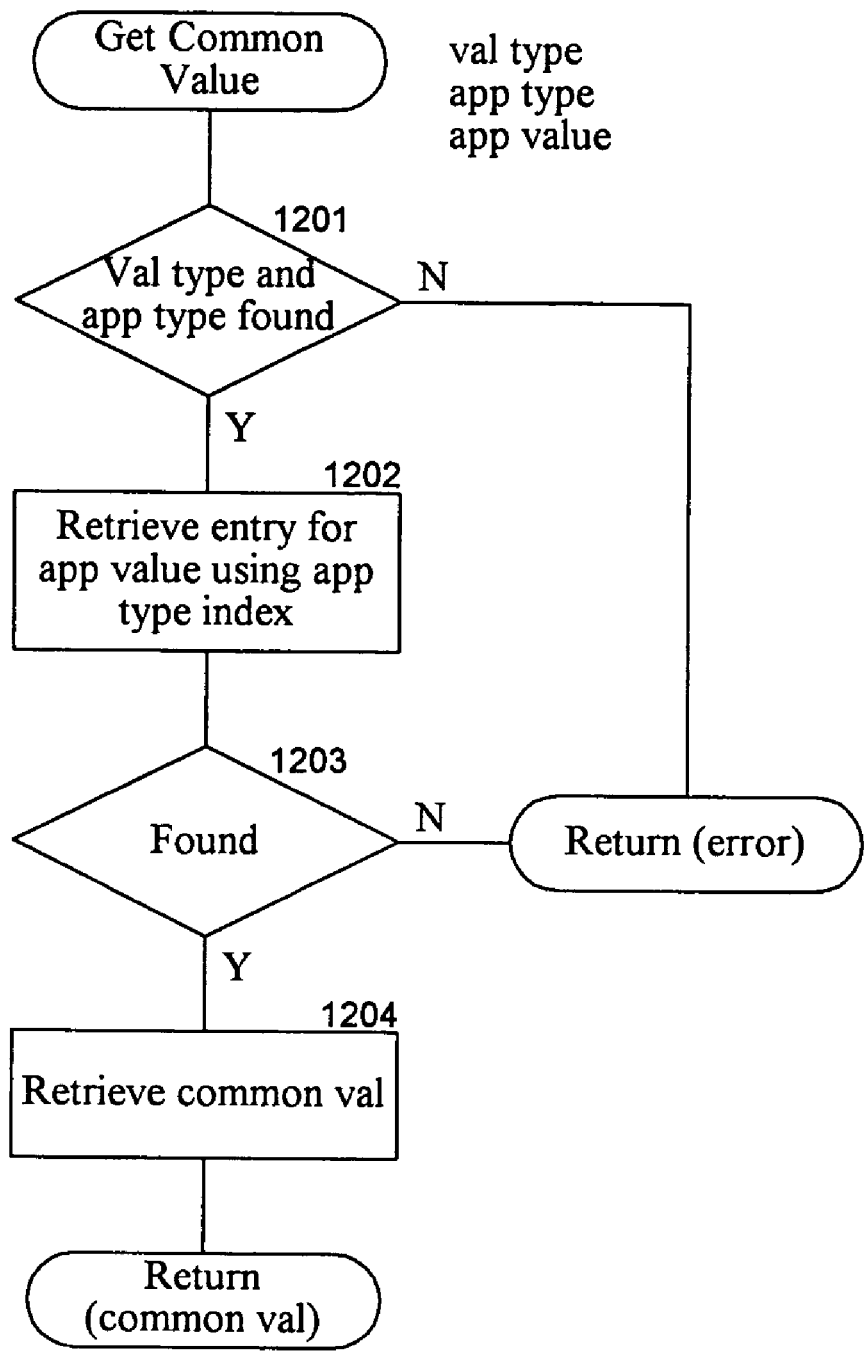
FIG. 12 is a flow diagram of the get common value function in one embodiment.

FIGS. 11-12 are flow diagrams of the value cross-reference service functions in one embodiment. FIG. 11 is a flow diagram of the get application value function in one embodiment. The function is passed a value type, an application type, and a common value. The function returns the application value for the passed application type corresponding to the passed common value. In decision block 1101, if the passed value type is in the value type table and there is a field in the value mapping table for the passed application type, then the function continues at block 1102, else the function returns an error. In block 1102, the function retrieves an entry for the passed common value from the value mapping table using the index for the common value. In decision block 1103, if an entry was retrieved, then the function continues at block 1104, else the function returns an error. In block 1104, the function extracts the application value for the passed application type from the retrieved entry and then returns it.

FIG. 12 is a flow diagram of the get common value function in one embodiment. The function is passed a value type, an application type, and an application value. The function returns the common value corresponding to the passed application value. In decision block 1201, if the passed value type is in the value type table and the passed application type is a field within the value mapping table, then the function continues at block 1202, else the function returns an error. In block 1202, the function retrieves an entry for the passed application value from the value mapping table using the index for the passed application type. In decision block 1203, if the entry was retrieved, then the function continues at block 1204, else the function returns an error. In block 1204, the function extracts the common value from the retrieved entry and returns it.

Figure 13:
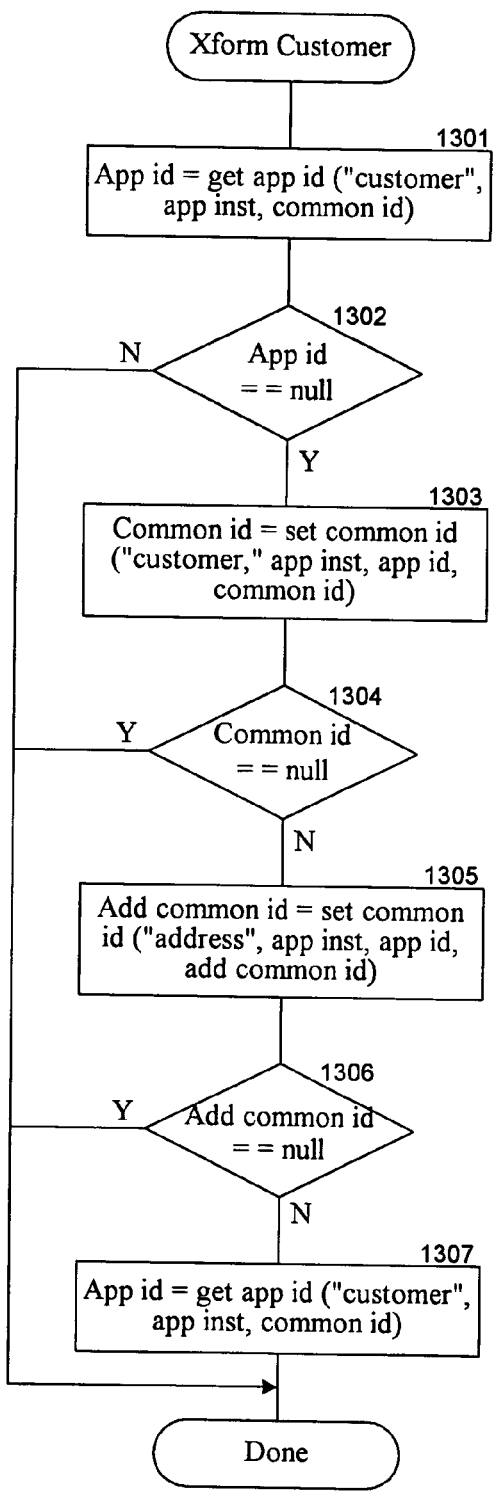
FIG. 13 is a flow diagram for transforming customer identifiers in one embodiment.

FIG. 13 is a flow diagram for transforming customer identifiers in one embodiment. This flow diagram corresponds to the processing of Table 3. The transform determines whether a customer identifier of an application has already been registered. If so, it returns the application identifier. If not, it registers the application identifier for the customer and registers the application identifier for the address. In block 1301, the transform invokes the get application identifier function passing an indication of the customer application type, the application instance, and a common identifier. In decision block 1302, if the function returns a null application identifier, then the transform continues at block 1303, else the transform completes. In block 1303, the transform invokes the set common identifier function passing the customer identifier type, the application instance, the application identifier, and the common identifier. In decision block 1304, if the returned common identifier is null, then the transform completes, else the transform continues at block 1305. In block 1305, the transform invokes the set common identifier function for the address identifier type, application instance, application identifier, and address common identifier. In decision block 1306, if the add common identifier returned by the function is null, then the transform completes, else the transform continues at block 1307. In block 1307, the transform invokes the get application identifier function passing the customer identifier type, the application instance, and the common identifier and then completes.

From the foregoing, it will be appreciated that specific embodiments of the integration server have been described herein for purposes of illustration and that various modifications may be made without deviating from the spirit and scope of the invention. One skilled in the art will appreciate that an application can provide different types of services. For example, a single application might provide order placement and order fulfillment services. A common service interface may be defined more generally for each type of service, rather than each type of application. Accordingly, the invention is not limited except as by the appended claims.

We claim:

1. A system comprising:
   one or more processors;
   a memory coupled to the one or more processors and storing code executable by the one or more processors to execute a process that interacts with a plurality of applications of a plurality of types of applications;
   a plurality of application service interfaces configured to be executed on the one or more processors, each application service interface being configured to interface with a corresponding application among the plurality of applications;
   a plurality of translation circuits comprising one translation circuit for (a) each of the plurality of application service interfaces and (b) each of a plurality of integration servers that facilitates data exchange among the applications, each translation circuit being configured to allow communication between a corresponding application service interface and a corresponding application on a corresponding integration server, and configured to provide an independence for the applications from the integration servers; and
   a plurality of common service interfaces configured to be executed on the one or more processors, each common service interface being configured to communicate with the process and with two or more of the application service interfaces that interface with a corresponding type of application among the plurality of types of applications.

2. The system of claim 1, wherein a first one of the common service interfaces is configured to communicate with two or more application service interfaces for applications of a Customer Relationship Management type.

3. The system of claim 2, wherein a second one of the common service interfaces is configured to communicate with two or more application service interfaces for applications of an Enterprise Resource Planning type.

4. The system of claim 2, wherein a second one of the common service interfaces is configured to communicate with two or more application service interfaces for applications of an Employee Relationship Management type.

5. The system of claim 1, wherein the process is configured to interface with the common service interfaces so that the process is independent of the particular applications among the plurality of applications and independent of an integration environment that facilitates data exchange among the applications.

6. The system of claim 5, wherein the integration environment is provided by an integration server.

7. The system of claim 1, wherein a first one of the application service interfaces and a first one of the common service interfaces are used by a first application among the plurality of applications to access a service of the process and for the process to access services of the first application.

8. The system of claim 1, wherein the process is among a plurality of processes that interact with the plurality of applications, and the memory stores codes executable by the one or more processors to execute the plurality of process.

9. The system of claim 1, further comprising:
a plurality of transform circuits comprising one transform circuit for each of the plurality of application service interfaces, each translation circuit being configured to allow communication between a corresponding application service interface and a corresponding common service interface, wherein each of the transform circuits is usable with the plurality of integration servers.

10. A method comprising:
receiving data from a first application through:
   a first translation circuit configured to interface with the first application through a first integration server interface,
   a first application service interface among a plurality of application service interfaces, wherein
      the first application service interface is configured to interface with the first translation circuit,
      the first application is of a first type of application among a plurality of types of applications,
      the first translation circuit is configured to provide an independence for the first application from the first integration server interface, and
      the receiving comprises storing the data in a computer memory, and
   a first common service interface among a plurality of common service interfaces, wherein
      the first common service interface is configured to communicate with two or more of the application service interfaces that interface with two or more corresponding applications of the first type; and
transmitting the data to a second application through:
   a second common service interface among the plurality of common service interfaces, wherein
      the second common service interface is configured to communicate with two or more of the application service interfaces that interface with two or more corresponding applications of a second type of application among the plurality of types of applications,
      the transmitting is performed using a processor coupled to the computer memory, and
   a second application service interface among the plurality of application service interfaces, wherein
      the second application service interface is configured to interface with the second application, and
      the second application is of the second type of application.

11. The method of claim 10, wherein a first one of the common service interfaces is configured to communicate with two or more application service interfaces for applications of a Customer Relationship Management type.

12. The method of claim 10, wherein a second one of the common service interfaces is configured to communicate with two or more application service interfaces for applications of an Enterprise Resource Planning type and a third one of the common service interfaces is configured to communicate with two or more application service interfaces for applications of an Employee Relationship Management type.

13. The method of claim 10, wherein communication through the first and second application service interfaces and through the first and second common service interfaces is independent of the first and second applications and independent of an integration environment that facilitates data exchange among the applications.

14. The method of claim 13, wherein the integration environment is provided by an integration server.

15. The method of claim 10, wherein the first application service interface and the first common service interface are used by the first application to access a service of a process and for the process to access services of the first application.

16. The method of claim 15, wherein the process is among a plurality of processes that interact with the first and second applications.

17. The method of claim 10, further comprising:
receiving the data through:
   a first transform circuit configured to allow communication between the first application service interface and the first common service interface, wherein the first transform circuit is usable with a plurality of types of integration servers.

18. The method of claim 17, further comprising:
transmitting the data through:
   a second transform circuit configured to allow communication between the second application service interface and the second common service interface, wherein the second transform circuit is usable with the plurality of types of integration servers, and
   a second translation circuit configured to interface with the second application service interface and with the integration server, and configured to provide an independence for the second application from the integration server.

19. A system comprising:
a computer server;
means for receiving data from a first application being executed on the computer server through:
   a first translation circuit configured to interface with the first application through a first integration server interface,
   a first application service interface among a plurality of application service interfaces, wherein
      the first application service interface is configured to interface with the first translation circuit, and
      the first application is of a first type of application among a plurality of types of applications,
      the first translation circuit is configured to provide an independence for the first application from the first integration server interface, and
   a first common service interface among a plurality of common service interfaces, wherein
      the first common service interface is configured to communicate with two or more of the application service interfaces that interface with two or more corresponding applications of the first type; and
means for transmitting the data to a second application through:
   a second common service interface among the plurality of common service interfaces, wherein
      the second common service interface is configured to communicate with two or more of the application service interfaces that interface with two or more corresponding applications of a second type of application among the plurality of types of applications, and
   a second application service interface among the plurality of application service interfaces, wherein
      the second application service interface is configured to interface with the second application, and the second application is of the second type of application.

20. The system of claim 19, wherein a first one of the common service interfaces is configured to communicate with two or more application service interfaces for applications of a Customer Relationship Management type.

21. The system of claim 19, wherein a second one of the common service interfaces is configured to communicate with two or more application service interfaces for applications of an Enterprise Resource Planning type and a third one of the common service interfaces is configured to communicate with two or more application service interfaces for applications of an Employee Relationship Management type.

22. The system of claim 19, wherein communication through the first and second application service interfaces and through the first and second common service interfaces is independent of the first and second applications and independent of an integration environment that facilitates data exchange among the applications.

23. The system of claim 22, further comprising an integration server that provides the integration environment.

24. The system of claim 19, wherein the first application service interface and the first common service interface are used by the first application to access a service of a process and for the process to access services of the first application.

25. The system of claim 24, wherein the process is among a plurality of processes that interact with the first and second applications.

26. The system of claim 19, further comprising:
means for receiving the data through:
a first transform circuit configured to allow communication between the first application service interface and the first common service interface, wherein the first transform circuit is usable with a plurality of types of integration servers.

27. The system of claim 26, further comprising:
means for transmitting the data through:
a second transform circuit configured to allow communication between the second application service interface and the second common service interface, wherein the second transform circuit is usable with the plurality of types of integration servers, and
a second translation circuit configured to interface with the second application service interface and with the integration server, and configured to provide an independence for the second application from the integration server.

28. A computer readable storage medium having encoded thereon instructions executable by a processor to perform acts of:
receiving data from a first application through:
a first translation circuit configured to interface with the first application through a first integration server interface,
a first application service interface among a plurality of application service interfaces, wherein
the first application service interface is configured to interface with the first translation circuit,
the first application is of a first type of application among a plurality of types of applications, and
the first translation circuit is configured to provide an independence for the first application from the first integration server interface, and
a first common service interface among a plurality of common service interfaces, wherein
the first common service interface is configured to communicate with two or more of the application service interfaces that interface with two or more corresponding applications of the first type; and
transmitting the data to a second application through:
a second common service interface among the plurality of common service interfaces, wherein
the second common service interface is configured to communicate with two or more of the application service interfaces that interface with two or more corresponding applications of a second type of application among the plurality of types of applications, and
a second application service interface among the plurality of application service interfaces, wherein
the second application service interface is configured to interface with the second application, and
the second application is of the second type of application.

* * * * *

UNITED STATES PATENT AND TRADEMARK OFFICE
CERTIFICATE OF CORRECTION

| | | |
|---|---|---|
| PATENT NO. | : 7,694,314 B2 | Page 1 of 1 |
| APPLICATION NO. | : 10/653028 | |
| DATED | : April 6, 2010 | |
| INVENTOR(S) | : Richard Mark Exley et al. | |

It is certified that error appears in the above-identified patent and that said Letters Patent is hereby corrected as shown below:

Title page, Item (56), in column 2, under "U.S. Patent Documents", line 2, delete "2003/1010588" and insert -- 2003/0105884 A1 --, therefor.

In column 9, line 49, delete "Services" and insert -- Service --, therefor.

Signed and Sealed this
Nineteenth Day of April, 2011

David J. Kappos
*Director of the United States Patent and Trademark Office*